(12) United States Patent
Ide et al.

(10) Patent No.: US 6,327,112 B1
(45) Date of Patent: Dec. 4, 2001

(54) ADJACENT TRACK POSITION DETECTABLE INFORMATION STORAGE APPARATUS

(75) Inventors: Hiroshi Ide, Kodaira; Futoshi Tomiyama, Hachioji; Yasutaka Nishida, Kokubunji; Takehiko Hamaguchi, Fuchu; Hisashi Takano, Kodaira; Yohji Maruyama, Iruma; Atsushi Nakamura, Kodaira, all of (JP); Hideki Sawaguchi, La Jolla, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/227,078

(22) Filed: Jan. 5, 1999

(30) Foreign Application Priority Data

Jan. 13, 1998 (JP) .................................................. 10-004496

(51) Int. Cl.$^7$ .............................. G11B 5/596; G11B 5/09
(52) U.S. Cl. ..................... 360/78.04; 360/48; 360/77.08; 360/55
(58) Field of Search ................................. 360/69, 55, 71, 360/75, 77.04, 60, 48, 77.08, 78.04, 78.14, 77.06; 369/275.3, 44.26

(56) References Cited

U.S. PATENT DOCUMENTS

| | | |
|---|---|---|
| 4,511,938 | 4/1985 | Betts ........................................ 360/77 |
| 5,126,895 | 6/1992 | Yasuda et al. ..................... 360/77.07 |
| 5,570,244 | * 10/1996 | Wiselogel ................................ 360/60 |
| 5,923,488 | * 7/1999 | Ino ........................................ 360/60 |
| 6,046,870 | * 4/2000 | Karube ................................ 360/60 X |

FOREIGN PATENT DOCUMENTS

| | | |
|---|---|---|
| 0798698 | 10/1997 | (EP) . |
| 8-321149 | 12/1996 | (JP) . |

OTHER PUBLICATIONS

Patent Abstracts of Japan; vol. 018, No. 379 (P–1771), Jul. 15, 1994, Disk Device Nobuhiko.

* cited by examiner

*Primary Examiner*—Andrew L. Sniezek
(74) *Attorney, Agent, or Firm*—Kenyon & Kenyon

(57) ABSTRACT

An information storage apparatus has a disk medium setting data recording areas along a plurality of tracks concentrically arranged, a head for recording and reproducing data on tracks of the disk medium, an actuator for moving the head to a desired track among the plurality of tracks. Also included is an electric circuit for controlling recording and reproducing in response to detecting the distance from a recorded magnetization pattern on an adjacent track in the radial direction by detecting previously recorded signals on adjacent tracks while data recording. Even if the track density is increased, the upper limit of a threshold value of a function for preventing off-track recording of the information storage apparatus can be increased and a high track density of the information storage apparatus can be easily realized.

12 Claims, 7 Drawing Sheets

ADJACENT TRACK POSITION DETECTABLE INFORMATION STORAGE APPARATUS

BACKGROUND OF THE INVENTION

In a magnetic disk unit, a plurality of circular magnetic disks are fixed to the drive shaft of the spindle motor and rotated and driven together with the spindle motor. An air layer (air bearing) is generated between the surface of a rotating magnetic disk and the slider with a magnetic head mounted and the magnetic head relatively moves on the magnetic disk with a fine interval held. The surface of the magnetic disk is finely textured so as to prevent it from sticking to the slider and improve magnetic characteristics (characteristics of flying height).

When the magnetic head relatively moves on the magnetic disk, an offtrack is generated due to the fluttering phenomenon caused by vibration of the bearing in the spindle motor and a minute bending of the magnetic disk, a texture mark on the magnetic disk, and vibration of servo information which is recorded on the magnetic disk beforehand.

Therefore, the track follow-up control is executed so as to demodulate a track position signal from the reproduced servo information during data recording and reproducing and suppress the amount of offtrack on the basis of the signal. In the embedded servo system, the servo information area is arranged at each fixed interval on the same recording track as the data recording area and the pattern for detection of servo information is recorded in the area beforehand.

SUMMARY OF THE INVENTION

The present invention relates to a control system for positioning a recording head for recording tracks provided on a circular information recording medium of a magnetic disk unit or an optical disk unit and recording information and more particularly to an information storage apparatus using a function for detecting the offtrack state that the recording head is off a desired position.

Since the number of servo areas is limited because it is necessary to reserve as many data storage areas as possible, it is difficult to set a sufficiently wide track bandwidth in follow-up control. Therefore, when the amount of offtrack is suddenly changed due to vibration, a follow-up error remains due to the shortage of bandwidth in follow-up control and an occurrence of offtrack cannot be avoided.

When this offtrack becomes larger, a recorded magnetization pattern is recorded overlapped to the adjacent track. In this case the adjacent track which was recorded prior to the squeezing track becomes narrower because a part of this track is invaded by the squeezing track. Moreover, the crosstalk from the squeezing track becomes larger when reproducing this track. By these reason, a suspicion that the squeezed adjacent track cannot be reproduced without any error is enlarged.

Therefore, during recording of data, by monitoring the amount of offtrack, the recording operation (offtrack write) in the offtrack state is prevented. Namely, the technology for inhibiting the recording operation when it is detected that the amount of offtrack before recording or during recording exceeds the specified value (hereinafter, called the threshold value) is applied.

Also on an optical disk for recording and reproducing data using light or both light and magnetism, in the same way as with a magnetic disk, by demodulating a track position signal from servo information reproduced from a recording track during data recording and monitoring the amount of offtrack during recording, the recording operation in the state of offtrack is prevented.

There is an appropriate setting range for the threshold value in this technology for preventing from offtrack recording. If this value is excessively large, there is a danger that the adjacent recorded magnetization pattern is destroyed and cannot be reproduced without error. On the other hand, when the value is excessively small, it is frequently detected that the amount of offtrack exceeds this threshold value, and the recording operation is stopped, and it is necessary to wait by one rotation or more for re-recording, so that the throughput reduces substantially. Therefore, it is necessary to set the threshold value within a range that these phenomena will not be generated.

To correspond to an increase in storage capacity and a decrease in cost in a recent information storage apparatus, it is essential to improve the recording density and it is necessary to increase the recording density in the circumferential direction on a recording medium and also the track density. However, when the track pitch is narrowed, the distance between a track and its adjacent track becomes smaller, so that the track is easily overlapped with the adjacent recording track. Therefore, the upper limit of the threshold value in the aforementioned technology for preventing from offtrack recording is reduced.

Furthermore, this function for preventing from offtrack recording detects the position relation with the servo pattern recorded beforehand and does not directly detect the distance from the adjacent data track. Furthermore, this servo pattern is not identical with that of the adjacent track and the follow-up control is executed with independent servo patterns when each track is followed. Therefore, there is the possibility that the servo pattern on a track is recorded in the offtrack position due to vibration, and in this case the distance between the adjacent track and the data track becomes smaller.

Namely, the distance from the recorded magnetization pattern recorded on the adjacent track is indirectly inferred based on the standard of the servo pattern including an error and the actual distance is not known. Therefore, a worst situation that the adjacent track squeezes the data track and the servo patterns of the these two tracks are located in the offtrack position is forced to suppose. It is necessary even in this situation to make the upper limit of the threshold value more smaller so as to prevent the recorded magnetization pattern of the data track from overlapping with the recorded magnetization pattern of the adjacent track.

Under the aforementioned restriction condition, even if the track density is comparatively low, this settable range is vanished and a more narrower track pitch cannot be realized.

To solve these problems, dedicated areas (areas for recording position error checking pattern) for recording a position error checking pattern are provided at a plural locations on the same track as the data recording area on a magnetic disk and the position error checking pattern is recorded in the areas during data recording.

A recording circuit having a function for recording the above position error checking pattern with more recording current than that at general data recording time is provided. Furthermore, a reproducing circuit having a function for demodulating leakage signals (hereinafter called adjacent track position signals) from the position error checking patterns of the left and right adjacent tracks and detecting the distance from the recorded magnetization patterns on the adjacent tracks in the radial direction is provided.

The aforementioned position error checking patterns are arranged by shifting the positions in the circumferential direction from those on the adjacent tracks so as to prevent the demodulation operation of the adjacent track position signals and the recording operation of the position error checking pattern of the data track from being performed at the same time.

The present invention directly detects the distance from the recorded magnetization patterns recorded on the adjacent tracks by detecting the adjacent track position signals when recording data on the data track and judges prevention from offtrack recording. As a result, although in the conventional technology for preventing from offtrack recording, since the actual distance from the recorded magnetization patterns recorded on the adjacent tracks is not known, it is forced to reduce the upper limit of the threshold value on the assumption of a worst condition, according to the present invention, the upper limit of the threshold value can be increased and the track density can be increased.

Therefore, according to the present invention, the distance from the recorded magnetization patterns recorded on the adjacent tracks can be directly detected. As a result, the upper limit of the threshold value in the conventional technology for preventing from offtrack recording can be increased and even if the track density is increased, the threshold value setting range exists and a high track density of an information storage apparatus can be easily realized.

DETAILED DESCRIPTION OF THE PREFERRED EMBODIMENTS

One embodiment of the present invention will be explained with the accompanying drawings.

Figure 1:
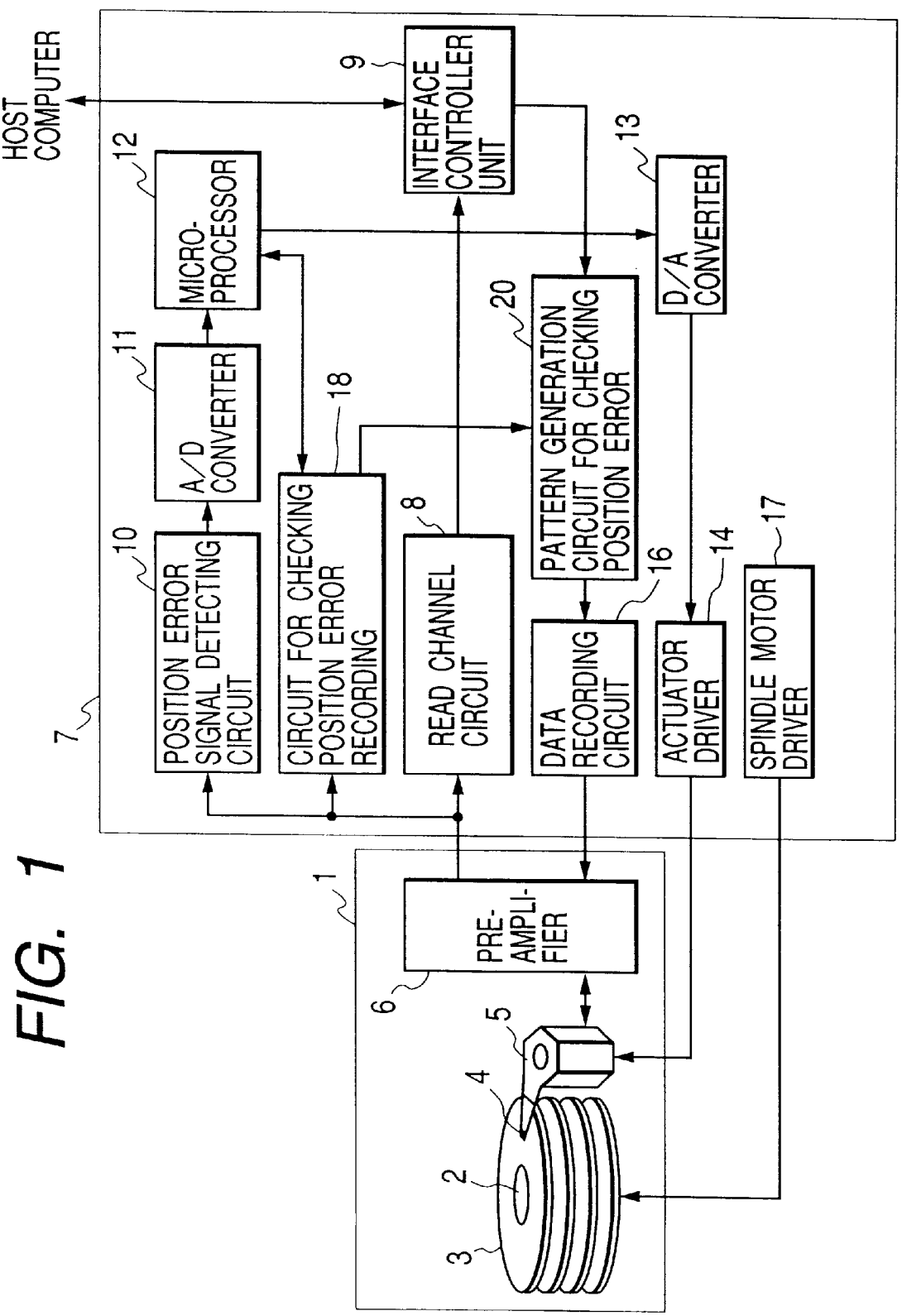
FIG. 1 is a block diagram showing the constitution of a magnetic disk unit to which the present invention is applied.

FIG. 1 is a block diagram showing the constitution of a magnetic disk unit to which the present invention is applied. In an HDA (head disk assembly) 1, a plurality of data disks 3 rotating by an in-hub motor 2, a plurality of magnetic heads 4 face each of the data disks 3, an actuator 5 for moving each magnetic head 4 in one, and a preamplifier 6 for writing and reading with the magnetic heads 4 are housed.

Outside the HDA 1, a circuit board 7 is fixed. The output from the preamplifier 6 is inputted to a read data demodulating circuit 8, demodulated to digital data, and then inputted to an interface controller unit 9. The interface controller unit 9 is connected to a host computer via a connector and an interface cable.

The output from the preamplifier 6 is also inputted to a position error signal reproducing circuit 10 and a circuit for checking position error recording 18. A position error signal demodulated by the position error signal reproducing circuit 10 is inputted to an A/D converter 11. The A/D converter 11 is connected to a microprocessor 12. The microprocessor 12 fetches position information and performs the calculation for the seek or track follow-up operation.

The circuit for checking position error recording 18 demodulates an adjacent track position signal and decides whether the amount of position error during recording is more than the threshold value. When it is judged that the amount is more than the threshold value, the circuit sends recording inhibition signal to the microprocessor 12 and stops the recording operation.

The output of the microprocessor 12 is converted to an analog signal by a D/A converter 13 and inputted to an actuator driver 14, which generates a drive current for the actuator 5 and controls positioning of the magnetic head 4.

During data recording, data is sent to a data recording circuit 16 from the interface controller unit 9 via a pattern generation circuit for checking position error 20 and recorded as a recorded magnetization pattern on the data disk 3 from the magnetic head 4 via the recording circuit in the preamplifier 6.

During data recording, the pattern generation circuit for checking position error 20 generates a position error checking pattern by an instruction from the circuit for checking position error recording 18. The position error checking pattern is sent to the recording circuit in the preamplifier 6 and recorded on the data disk 3 in the same way as with data.

A spindle motor driver 17 starts or stops the in-hub motor by control from the microprocessor 12.

A logical circuit such as a gate array may be used instead of the microprocessor 12 if the aforementioned function can be realized.

Figure 2:
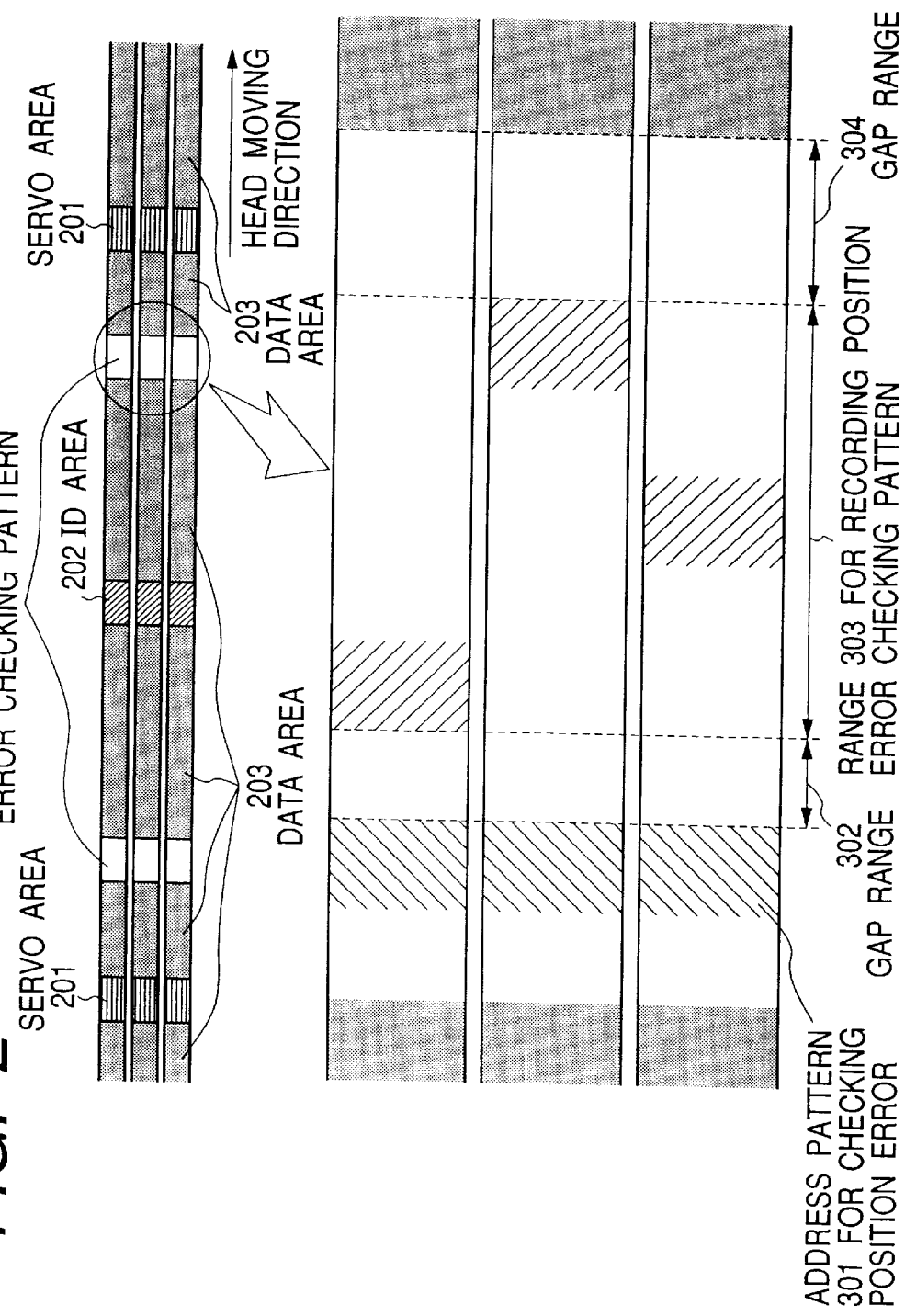
FIG. 2 is a drawing showing the constitution in magnetic tracks on a data disk.

FIG. 2 is a drawing showing the arrangement of areas for recording position error checking pattern on magnetic tracks on the data disk 3 and the constitution thereof. The recording track mainly comprises a conventional servo area 201 for recording embedded servo information, an ID area 202 for recording identification information of each data, a data area 203, and an area 204 for recording position error checking pattern.

At the top of the area 204 for recording position error checking pattern, an address pattern 301 for checking position error indicating the start of the area for recording position error checking pattern is arranged. This pattern is recorded beforehand when an apparatus is manufactured in the same way as with the servo pattern in the servo area 201. The pattern may be any pattern. To detect the start of the area 204 for recording position error checking pattern more surely, it is desirable to select a pattern which does not exist in the recorded magnetization pattern actually recorded in the data area.

When actually recording data, the recording operation is suspended immediately before the address pattern 301 for checking position error appears and the mode is switched to the reproduction mode. When the address pattern 301 for checking position error is detected, according to the order of ranges 303 for recording position error checking pattern of the adjacent tracks and the data track, the apparatus enters the recording mode of position error checking pattern in the case of the range 303 for recording position error checking pattern of the data track and the detection mode of position error recording in the case of the range 303 for recording position error checking pattern of the adjacent tracks.

While the magnetic head passes through a gap range 304 which follows the address pattern 301, the pattern generation circuit for checking position error 20 is started in the case of the recording mode of position error checking pattern and the preamplifier 6 is switched status from recording to reproduction in the case of the detection mode of position error recording.

Figure 3:
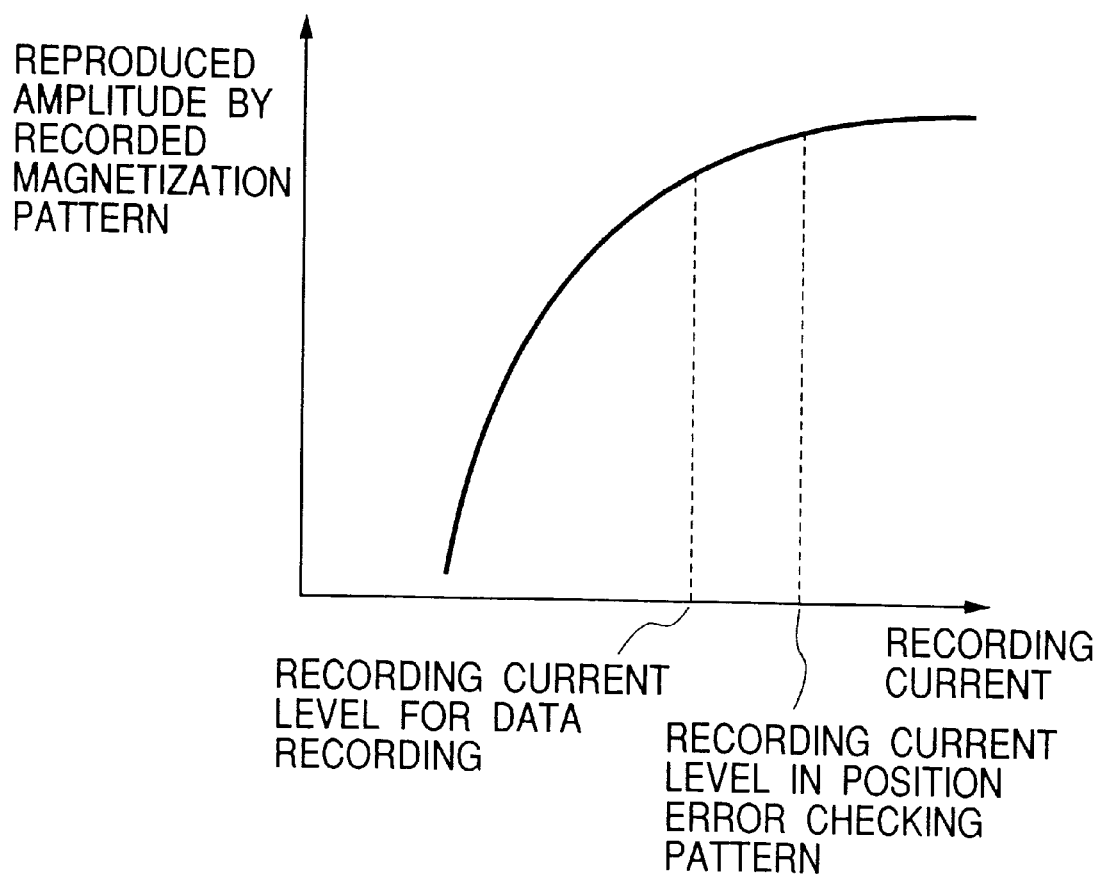
FIG. 3 is a graph showing the relationship between a recording current and the track width of a recorded magnetization pattern.

FIG. 3 shows the relationship between a recording current and the track width of a recorded magnetization pattern. When the recording current increases, the area on which the magnetic field intensity exceeds that necessary for recording is spread as far as a portion farther away from the track end as the magnetic field intensity generated from the magnetic head increases and as a result, the track width of the recorded magnetization pattern is also widened.

FIG. 2 will be explained once again. When recording a position error checking pattern in the range 303 for recording position error checking pattern following to the gap range 302, the recording current is set to be larger than that at general data recording time and a position error checking pattern with a track width wider than that of the recorded magnetization pattern of general data is recorded using the characteristic shown in FIG. 3. By doing this, the leakage amount of this position error checking pattern into the adjacent magnetic tracks increases and the amount of position error can be detected more accurately.

Following to the range 303 for recording position error checking pattern, the gap range 304 is placed again and the track is returned to the data area 203. While the magnetic head passes through the gap range 304, the recording current is switched from the set value for position error checking pattern to the general set value for data recording.

The areas 204 for recording position error checking pattern of the data track and left and right adjacent tracks are arranged so that the positions in the circumferential direction coincide with each other. However, the range 303 for recording position error checking pattern among them is arranged by shifting from the range 303 for recording position error checking pattern of the adjacent tracks so as to prevent the demodulation operation of the adjacent track position signals and the recording operation of the position error checking pattern of the data track from being generated at the same time. Furthermore, it is also possible to shift and arrange the ranges 303 for recording position error checking pattern of the left and right adjacent tracks and detect the distance from the recorded magnetization patterns of each side of adjacent tracks independently.

The magnetic head 4 may comprise a separate element of a dedicated recording element and a dedicated reproduction element. In this case, both elements are arranged at separated locations in the circumferential direction, so that in consideration of the distance between the elements, the ranges 303 for recording position error checking pattern are arranged so as to prevent the demodulation operation of the adjacent track position signals and the recording operation of the position error checking pattern of the data track from being generated at the same time. As a result, the ranges 303 for recording position error checking pattern may be arranged so that the left and right adjacent tracks are overlapped with that of data track in the circumferential direction.

The number of areas for recording position error checking pattern during one round of the magnetic tracks is decided by the frequency characteristic of position error. Namely, when there is the possibility that the bandwidth of position error is wide and the amount of position error greatly changes for a short time, it is necessary to increase the number of areas for recording position error checking pattern and conversely when the bandwidth of the position error is narrow, a small number of areas for recording position error checking pattern is acceptable.

When the number of areas for recording position error checking pattern is reduced, it is necessary to set a slightly small threshold value with some margin because there is the possibility that the amount of position error increases among the areas for recording position error checking pattern. Namely, to increase the track density, it is necessary to increase the number of areas for recording position error checking pattern. However, when the number is excessively increased, the rate occupied by the data area on the recording track becomes smaller and the apparatus capacity decreases. Therefore, it is desirable to set an optimum number from the balance of the two so that the apparatus capacity is maximized.

Figure 4:
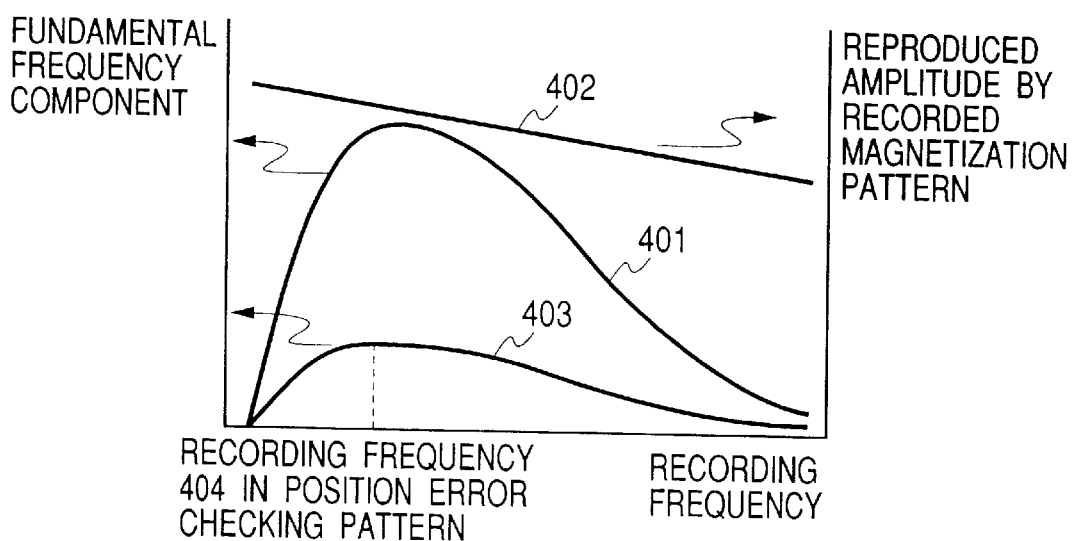
FIG. 4 is a graph showing the condition for deciding the recording frequency in a position error checking pattern.

As a position error checking pattern, a pattern of repeating a single frequency is used. FIG. 4 is a graph showing the condition for deciding the recording frequency in a position error checking pattern. Since in a position error checking signal, the leakage component of the position error checking pattern on the adjacent tracks is detected, so that the signal is weak compared with a reproduced signal in the general data area. Therefore, it is necessary to increase the SN ratio of the position error checking signal and improve the detection accuracy of the amount of position error.

Numeral 401 indicates the relationship between the recording frequency and the fundamental frequency component of a reproduced signal when a magnetic pattern of a single frequency recorded on a data disk is reproduced at the center of the track. In the case of magnetic recording, when the magnetic head passes on the magnetization reversed portion on the data disk, a single peak type (or dipulse type depending on the recording and reproducing system of a perpendical magnetic recording method) signal is generated and the other portions are almost constant level signals. Therefore, when the recording density is sufficiently low, most of reproduced signals are constant level signals and the fundamental frequency component of the reproduced signals is extremely small. As the recording density increases, the fundamental frequency component of the reproduced signals increases. When the recording density increases further more, the reproduced signals interfere with single peak signals with opposite polarity reproduced from the magnetization reversed portions before and after in waveform. In magnetic recording, when the single peak signals reproduced from the magnetization reversed portions before and after interfere in waveform, the signal amplitude reduces because the polarities are reverse. Therefore, as the recording density increases, the fundamental frequency component of the reproduced signals reduces. (Even in the case of a perpendical magnetic disk generating a dipulse type signal, the same characteristic is shown.)

Namely, at some recording frequency, a condition that the fundamental frequency component of a reproduced signal is maximized exists. This frequency is occupied by the structure of a magnetic head, the magnetic characteristic of a data disk, and the spacing amount between the magnetic head and the data disk.

Numeral 402 indicates the relationship between the recording frequency and the recording track width when a recorded magnetization pattern of a single frequency is recorded on a data disk. Generally, when the recording frequency increases, the recording track width reduces.

Numeral 403 indicates the relationship between the recording frequency and the fundamental frequency component of a reproduced signal when a signal is reproduced at a location off the track center. In this case, the component has a maximum value at a recording frequency 404 lower than that when reproduced at the track center due to the frequency characteristic of the recording track width.

Therefore, to make the position error checking signal as larger as possible, the frequency of a position error checking pattern is set around the frequency 404.

Figure 5:
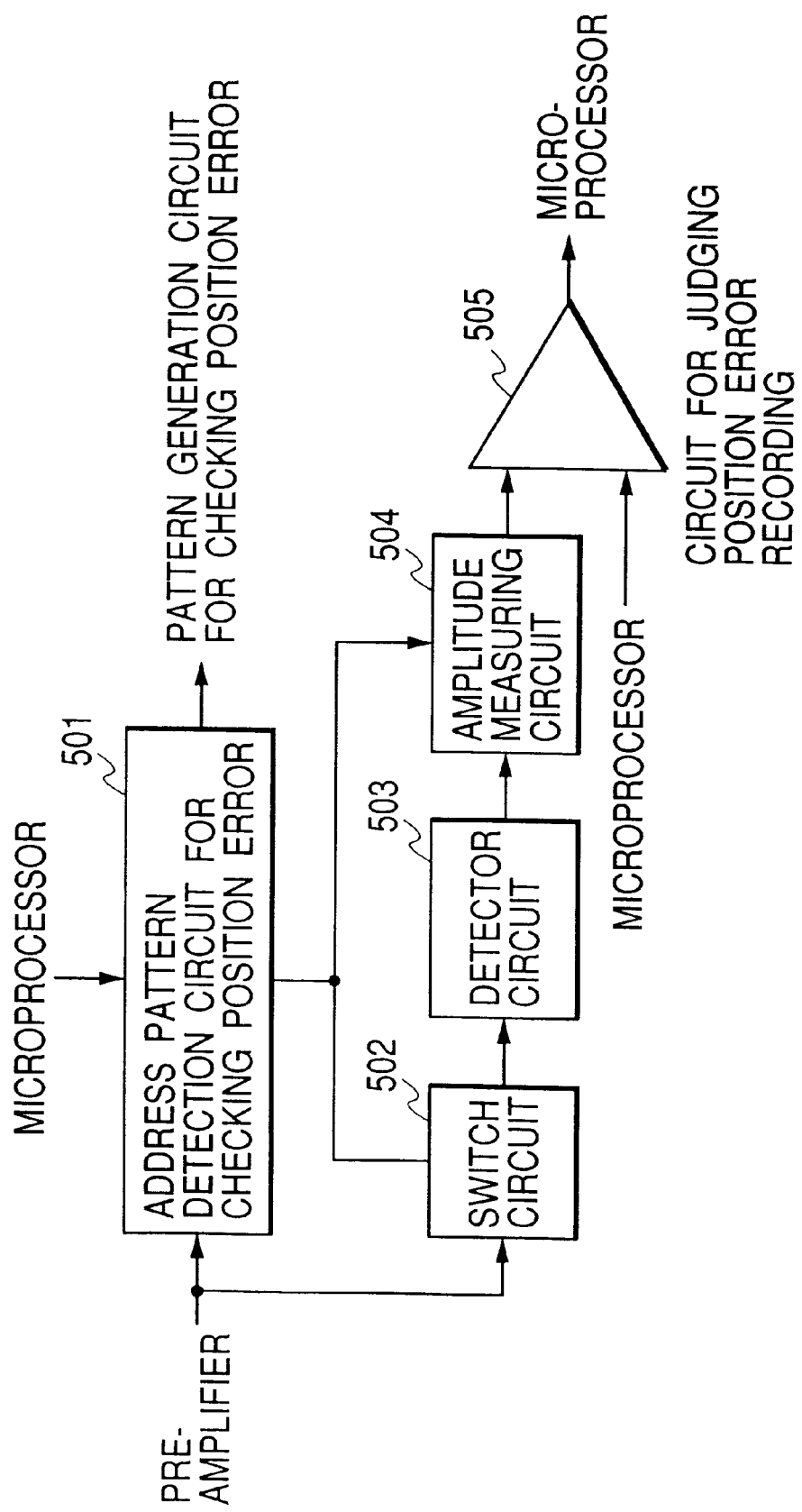
FIG. 5 is a block diagram showing a circuit for checking position error recording.

FIG. 5 is a block diagram showing the circuit for checking position error recording 18. A signal of the preamplifier 6 is inputted to an address pattern detection circuit for checking position error 501 and a switch circuit 502. When a position error checking address pattern is detected in the address pattern detection circuit for checking position error 501, a trigger signal is sent to the switch circuit 502 and the pattern generation circuit for checking position error 20 after a specific time respectively. The order of ranges 303 for recording position error checking pattern of the adjacent tracks and the data track is decided for each track beforehand and the information is inputted to the address pattern detection circuit for checking position error 501 from the microprocessor 12. According to the order information, when the magnetic head reaches the range 303 for recording position error checking pattern of each of the left and right adjacent tracks, a trigger signal is sent to the switch circuit 502 and when the magnetic head reaches the range 303 for recording position error checking pattern of the data track, a trigger signal is sent to the pattern generation circuit for checking position error 20.

The address pattern detection circuit for checking position error 501 has a counter circuit and when each range 303 for recording position error checking pattern ends, a trigger signal is sent to the switch circuit 502, an amplitude measuring circuit 504, and the pattern generation circuit for checking position error 20 to notify the end timing.

When the magnetic head reaches the range 303 for recording position error checking pattern of each of the adjacent tracks, the switch circuit 502 receives the trigger signal, is switched to the continuity state only for the period that the position error checking pattern is reproduced, and inputs a reproduced signal to a detector circuit 503. The detector circuit 503 selects only the fundamental frequency component of the position error checking signal and inputs it to the amplitude measuring circuit 504.

The amplitude measuring circuit 504 detects the magnitude of the fundamental frequency component of the position error checking signal and inputs the amplitude detection result at the end time of the range 303 for recording position error checking pattern to a circuit for judging position error recording 505 as an adjacent track position signal. The circuit for judging position error recording 505 compares the signal corresponding to the threshold value for judging position error recording from the microprocessor 12 with the adjacent track position signal. When the amount of position error corresponding to the adjacent track position signal is larger, recording inhibition signal is sent to the microprocessor 12 and subsequent data recording is stopped.

The switch circuit 502 and the detector circuit 503 in this block diagram are installed so as to accurately convert the adjacent track position signal from the position error checking signal. Since the quality of the position error checking signal is high, the two circuits may be omitted.

Figure 6:
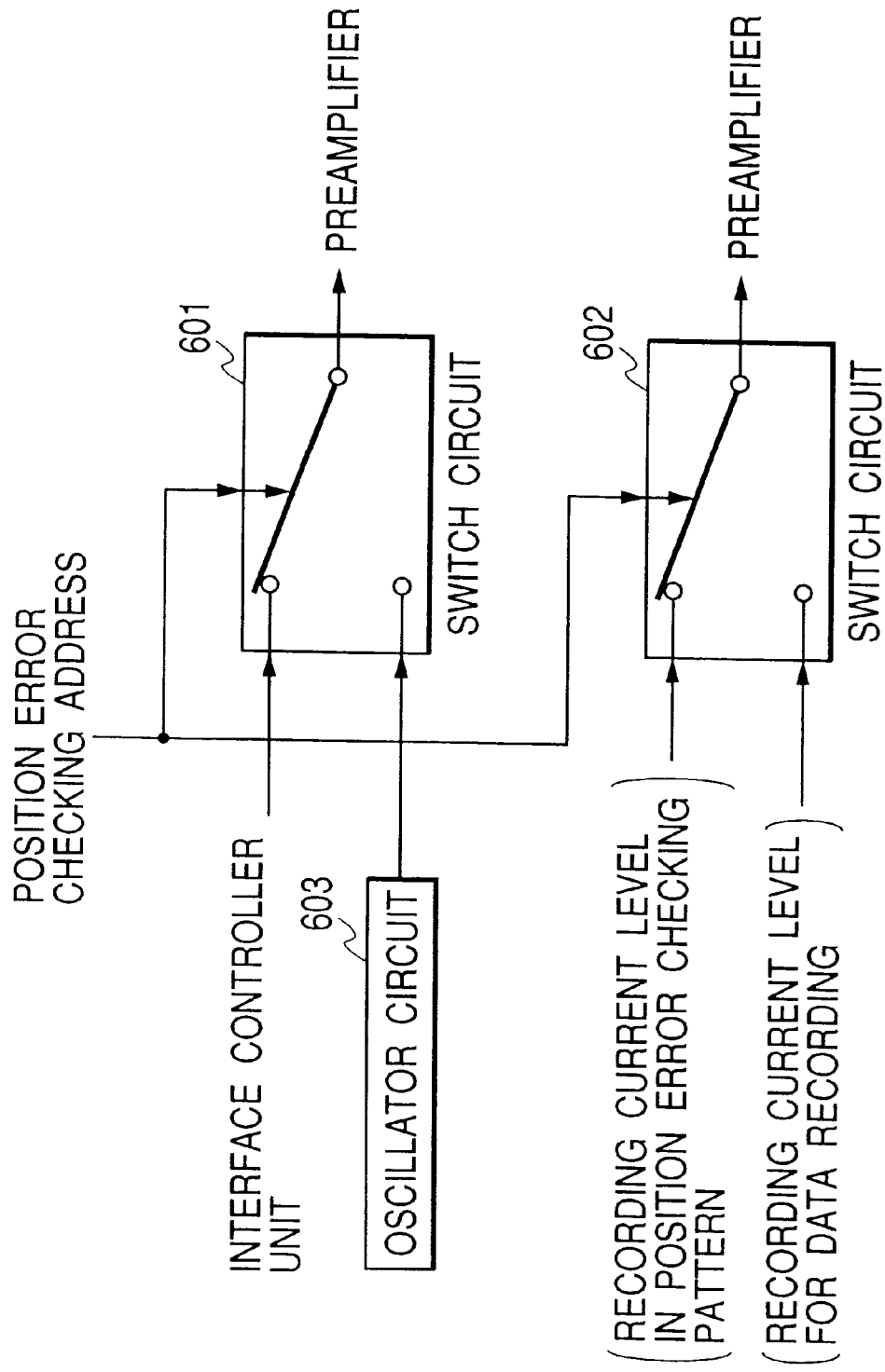
FIG. 6 is a block diagram showing a pattern generation circuit for checking position error.

FIG. 6 is a block diagram showing the pattern generation circuit for checking position error 20. There are two switch circuits 601 and 602 in the pattern generation circuit for checking position error 20 and both circuits switch which one of two input signals is to be outputted by a control signal from the address pattern detection circuit for checking position error 501.

The switch circuit 601 controls a recording pattern. In the data area, the switch circuit 601 selects a data signal and when the magnetic head reaches the range 303 for recording position error checking pattern of the data track, the switch circuit 601 switches it to a signal from an oscillator circuit 603 and inputs it to the preamplifier 6.

The switch circuit 602 controls the recording current level. In the data area, the switch circuit 602 selects the recording current level for data recording and when the magnetic head reaches the range 303 for recording position error checking pattern of the data track, the switch circuit 602 switches it to the recording current level for recording a position error checking pattern and inputs it to the preamplifier 6.

When the range 303 for recording position error checking pattern of the data track ends, the switch circuits 601 and 602 switch to a data signal and the recording current level for data recording respectively again.

Figure 7:
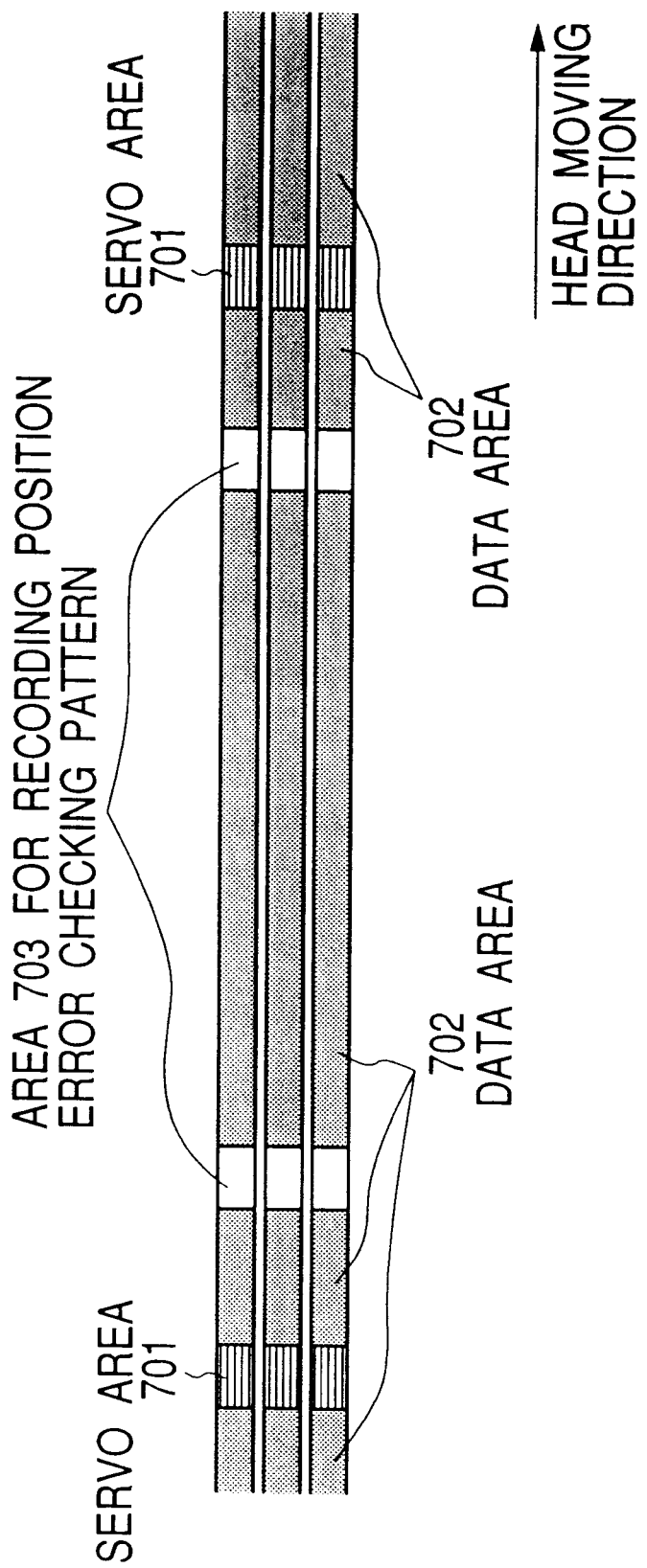
FIG. 7 is a drawing showing another example regarding the constitution of magnetic tracks on a data disk.

FIG. 7 is a drawing showing the arrangement of areas for recording position error checking pattern in magnetic tracks on the data disk 3 when there is no ID area 202 in the magnetic tracks. Also in this case, in the same way as with FIG. 2, a servo area 701, a data area 702, and an area for recording position error checking pattern 703 are arranged in the magnetic tracks. It is assumed that the relationship of the position of the area for recording position error checking pattern 703 with the adjacent tracks and the constitution in the area are the same as those shown in FIG. 2 and the number of areas for recording position error checking pattern 703 for one round is decided by the same standard as that shown in FIG. 2.

In this embodiment, as a circuit constitution necessary to realize the circuit for preventing from offtrack recording of the present invention, an example that the pattern generation circuit for checking position error 20 and the circuit for checking position error recording 18 are added to the conventional magnetic disk circuit is explained. However, if a constitution has a function to be realized in the two circuits, there is no need to independently install it. Namely, the preamplifier 6, the read channel circuit 8, and the microprocessor 12 may have the whole or a part of the function.

In this embodiment, an application example of the circuit for preventing from position error recording of the present invention to a magnetic disk unit is explained. However, the present invention can be applied to an information auxiliary storage apparatus such as an optical disk in addition to a magnetic disk unit using the same constitution.

The invention claimed is:
1. An information storage apparatus, comprising:
    a disk medium including data recording areas and servo areas along a plurality of tracks concentrically arranged;
    a head for recording and reproducing data on tracks of said disk medium;
    an actuator for moving said head to a desired track;
    a position error checking pattern recorded in said data recording area;
    means for detecting a distance between said desired track and its adjacent track based on the signals of said position error checking pattern; and
    a circuit for controlling movement of the head based upon the detected distance between said desired track and its adjacent track.

2. An information storage apparatus according to claim 1, wherein said circuit for controlling is adapted to stop the recording operation when said detected signal representative of a distance between one track and its adjacent track is greater then a predetermined amount indicating that the corresponding distance is shorter than a specified value.

3. An information storage apparatus according to claim 2, wherein said specified value is set within a range that said signal recorded on said adjacent tracks can be normally reproduced.

4. An information storage apparatus according to claim 1, wherein dedicated areas recording dedicated signal recorded on said adjacent tracks for detecting the distance from said signal recorded on said adjacent track in the radial direction are provided at a plurality of locations on the same track as that of said data recording areas.

5. An information storage apparatus according to claim 4, wherein said apparatus detects said dedicated signals recorded on the adjacent tracks during data recoding, and records said dedicated signals recorded in said dedicated areas on said track at the same time.

6. An information storage apparatus according to claim 5, wherein said dedicated areas in the circumferential direction, on said track and said adjacent tracks coincide on the same radial line.

7. An information storage apparatus according to claim 5, wherein the ranges for recording said dedicated signals recorded in said dedicated areas are shifted and arranged in the circumferential direction for said track and said adjacent tracks.

8. An information storage apparatus according to claim 1, wherein a single repetitive recorded pattern is used as a signal for detecting the distance in the radial direction from said signals recorded on said adjacent tracks.

9. An information storage apparatus according to claim 8, wherein the recording frequency of said recorded pattern is within the range from 0.5×Fp to 2×Fp, where said Fp is a recording frequency at which the fundamental frequency component of a reproduced signal is maximized.

10. An information storage apparatus according to claim 1, wherein when recording a signal for detecting the distance from said signals recorded on said adjacent tracks in the radial direction, a recording current larger than that used during general data recording is used.

11. An information storage apparatus comprising:

a disk medium setting data recording areas along a plurality of tracks concentrically arranged;

a head for recording and/or reproducing data on tracks of said disk medium;

an actuator for moving said head to a desired track among said plurality of tracks;

means for detecting a signal representative of a distance between one track and its adjacent track in the radial direction, including detecting a signal recorded on said adjacent track with a head running on said one track; and a circuit for controlling recording and/or reproducing of data on said track based upon the detected distance between said desired track and its adjacent track;

wherein when recording a signal for detecting the distance from said signals recorded on said adjacent tracks in the radial direction, a recording current larger than that used during general data recording is used.

12. An information storage apparatus, comprising:

a disk medium setting data recording areas along a plurality of tracks concentrically arranged;

a head for recording and/or reproducing data on tracks of said disk medium;

an actuator for moving said head to a desired track among said plurality of tracks;

means for detecting a signal representative of a distance between one track and its adjacent track in the radial direction, including detecting a signal recorded on said adjacent track with a head running, on said one track; and a circuit for controlling recording and/or reproducing of data on said track based upon the detected distance between said desired track and its adjacent track;

wherein dedicated areas recording dedicated signal recorded on said adjacent tracks for detecting the distance from said signal recorded on said adjacent track in the radial direction are provided at a plurality of locations on the same track as that of said data recording areas, said apparatus detecting said dedicated signals recorded on the adjacent tracks during data recording, and records said dedicated signals recorded in said dedicated areas on said track at the same time, and the ranges for recording said dedicated signals recorded in said dedicated areas are shifted and arranged in the circumferential direction for said track and said adjacent tracks.

* * * * *